US011744171B2

(12) United States Patent
Goodwin et al.

(10) Patent No.: US 11,744,171 B2
(45) Date of Patent: Sep. 5, 2023

(54) READY-TO-USE HOSE END SPRAYER

(71) Applicant: OMS Investments, Inc., Los Angeles, CA (US)

(72) Inventors: Randy M. Goodwin, Grove City, OH (US); Paul M. Havlovitz, Dublin, OH (US); Paul Hsu, Lewis Center, OH (US); Jay F. Perkins, Pickerington, OH (US)

(73) Assignee: OMS Investments, Inc., Los Angeles, CA (US)

( * ) Notice: Subject to any disclaimer, the term of this patent is extended or adjusted under 35 U.S.C. 154(b) by 0 days.

(21) Appl. No.: 17/568,983

(22) Filed: Jan. 5, 2022

(65) Prior Publication Data

US 2022/0124970 A1   Apr. 28, 2022

Related U.S. Application Data

(63) Continuation of application No. 15/969,150, filed on May 2, 2018, now abandoned, which is a continuation
(Continued)

(51) Int. Cl.
*A01C 23/04* (2006.01)
*B05B 1/30* (2006.01)
(Continued)

(52) U.S. Cl.
CPC ......... *A01C 23/047* (2013.01); *A01M 7/0046* (2013.01); *B05B 1/3026* (2013.01);
(Continued)

(58) Field of Classification Search
CPC .. A01C 23/047; A01M 7/0046; B05B 1/3026; B05B 7/244; B05B 7/2443; B05B 7/2408
(Continued)

(56) References Cited

U.S. PATENT DOCUMENTS

| 241,307 | A | 5/1881 | Corwin |
| 260,829 | A | 7/1882 | Bradley |

(Continued)

FOREIGN PATENT DOCUMENTS

| EP | 0 591 601 | 9/1992 |
| EP | 0 677 401 | 10/1995 |

(Continued)

OTHER PUBLICATIONS

International Search Report for International Patent Application No. PCT/US2009/069396 dated Mar. 1, 2010.
(Continued)

*Primary Examiner* — Tuongminh N Pham
*Assistant Examiner* — Kevin Edward Schwartz
(74) *Attorney, Agent, or Firm* — Frost Brown Todd LLP

(57) ABSTRACT

A ready-to-use sprayer comprises a container defining an interior compartment for containing a liquid product and having a pin receiver located near the rear portion and an opening located near the front portion, a housing having a main chamber and a grip portion, a nozzle in selective fluid communication with the outlet of the fluid chamber, a pivot switch on the exterior of the housing for selecting a fluid flow condition for the main chamber, and the housing being coupled to the container at the container opening and the pin receiver.

19 Claims, 9 Drawing Sheets

Related U.S. Application Data of application No. 14/577,225, filed on Dec. 19, 2014, now Pat. No. 9,980,430, which is a continuation of application No. 13/038,062, filed on Mar. 1, 2011, now abandoned.

(51) Int. Cl.
*B05B 7/24* (2006.01)
*A01M 7/00* (2006.01)

(52) U.S. Cl.
CPC ............ *B05B 7/244* (2013.01); *B05B 7/2443* (2013.01); *B05B 7/2408* (2013.01)

(58) Field of Classification Search
USPC ........................................................ 239/378
See application file for complete search history.

(56) References Cited

U.S. PATENT DOCUMENTS

| | | |
|---|---|---|
| 337,268 A | 3/1886 | Keedy |
| 557,987 A | 4/1896 | Frank |
| 813,254 A | 2/1906 | Sweeney |
| 1,264,503 A | 4/1918 | Griffin |
| 1,456,408 A | 5/1923 | Scherer |
| 1,521,831 A | 1/1925 | Olvawitsz |
| 1,544,503 A | 6/1925 | Wayne |
| 1,595,231 A | 8/1926 | Dryer |
| 1,631,951 A | 6/1927 | McAnsh |
| 1,912,759 A | 6/1933 | Clark |
| 1,982,094 A | 11/1934 | Gessler |
| 2,006,437 A | 7/1935 | Burgess et al. |
| 2,050,522 A | 8/1936 | Evans et al. |
| 2,135,665 A | 11/1938 | Hoban |
| 2,246,211 A | 6/1941 | Kilich |
| 2,248,701 A | 7/1941 | Fowler |
| 2,293,390 A | 8/1942 | Hengesback |
| 2,348,205 A | 5/1944 | Chater |
| 2,388,445 A | 11/1945 | Stewart |
| 2,416,719 A | 3/1947 | Stockdale |
| 2,460,545 A | 2/1949 | Spreng |
| 2,485,723 A | 10/1949 | Fitzgerald |
| 2,490,194 A | 12/1949 | Ivar |
| 2,536,361 A | 1/1951 | Flanders |
| 2,580,629 A | 1/1952 | Wenzel |
| 2,590,596 A | 3/1952 | Ziskin et al. |
| 2,599,678 A | 6/1952 | Walker |
| 2,603,388 A | 7/1952 | Bryant |
| 2,647,798 A | 8/1953 | Ballard |
| 2,670,107 A | 2/1954 | Welden |
| 2,673,664 A | 3/1954 | Boysen |
| 2,711,928 A | 6/1955 | Randa |
| 2,754,152 A | 7/1956 | Gilmour |
| 2,760,820 A | 8/1956 | Cirese |
| 2,788,244 A | 4/1957 | Gilmour |
| 2,788,245 A | 4/1957 | Gilmour |
| 2,951,645 A | 9/1960 | Price et al. |
| 2,961,335 A | 11/1960 | Shepard |
| 2,981,284 A | 4/1961 | Putnam |
| 2,991,939 A | 7/1961 | Packard |
| 3,088,679 A | 5/1963 | Ford |
| 3,104,823 A | 9/1963 | Hayes |
| 3,122,325 A | 2/1964 | William et al. |
| 3,123,253 A | 3/1964 | Lambton |
| 3,140,018 A | 7/1964 | Miller |
| D200,960 S | 4/1965 | Beinert |
| 3,181,797 A | 5/1965 | Hayes |
| 3,185,358 A | 5/1965 | Marler |
| 3,207,443 A | 9/1965 | Gilmour |
| 3,233,783 A | 2/1966 | Thornton |
| 3,253,788 A | 5/1966 | McHugh et al. |
| 3,254,844 A | 6/1966 | Blasnik et al. |
| 3,255,924 A | 6/1966 | Modderno |
| 3,319,983 A | 5/1967 | Rodgers |
| 3,323,685 A | 6/1967 | Schultz |
| 3,372,846 A | 3/1968 | Berkus |
| 3,381,899 A | 5/1968 | Forsman |
| 3,401,840 A | 9/1968 | McConnell et al. |
| 3,412,937 A | 11/1968 | Chamberlain |
| 3,443,726 A | 5/1969 | Muller et al. |
| 3,445,067 A | 5/1969 | Sheldall |
| 3,447,753 A | 6/1969 | Proctor et al. |
| 3,467,314 A | 9/1969 | Grubb |
| 3,499,606 A | 3/1970 | Smith |
| 3,632,046 A | 1/1972 | Hengesbach |
| 3,655,099 A | 4/1972 | Hazard |
| 3,764,074 A | 10/1973 | James |
| 3,770,205 A | 11/1973 | Proctor et al. |
| 3,833,177 A | 9/1974 | Pesley et al. |
| D234,952 S | 4/1975 | Rouquie |
| D235,063 S | 5/1975 | Gunzel et al. |
| 3,940,069 A | 2/1976 | Gunzel, Jr. et al. |
| 3,964,689 A | 6/1976 | Horvath |
| 3,993,245 A | 11/1976 | Smith |
| 4,027,822 A | 6/1977 | Usher |
| 4,058,259 A | 11/1977 | Schantz |
| D251,793 S | 5/1979 | DeGelder |
| 4,153,184 A | 5/1979 | Parish et al. |
| 4,250,911 A | 2/1981 | Kratz |
| 4,291,814 A | 9/1981 | Conn |
| 4,349,157 A | 9/1982 | Beiswenger et al. |
| 4,369,921 A | 1/1983 | Beiswenger et al. |
| 4,382,552 A | 5/1983 | Lubsen et al. |
| 4,396,356 A | 8/1983 | Thompson |
| 4,418,869 A | 12/1983 | Healy |
| 4,442,977 A | 4/1984 | Beiswenger et al. |
| 4,491,254 A | 1/1985 | Viets et al. |
| 4,527,740 A | 7/1985 | Gunzel, Jr. et al. |
| D281,899 S | 12/1985 | Gunzel, Jr. et al. |
| D281,900 S | 12/1985 | Gunzel, Jr. et al. |
| 4,624,413 A | 11/1986 | Corsette |
| 4,651,930 A | 3/1987 | Magaha, Jr. |
| 4,664,301 A | 5/1987 | Hoyt |
| 4,706,888 A | 11/1987 | Dobbs |
| 4,730,753 A | 3/1988 | Grime |
| 4,785,850 A | 11/1988 | Sanchez |
| D298,848 S | 12/1988 | Chon et al. |
| 4,811,870 A | 3/1989 | Bianco |
| 4,826,085 A | 5/1989 | Chow et al. |
| 4,878,619 A | 11/1989 | Norman |
| 4,890,792 A | 1/1990 | Martin et al. |
| 4,901,923 A | 2/1990 | McRoskey et al. |
| 4,901,976 A | 2/1990 | Smith |
| 4,925,105 A | 5/1990 | Lin |
| 4,933,569 A | 6/1990 | Merchlewitz |
| 4,982,896 A | 1/1991 | Crow |
| D322,838 S | 12/1991 | Hagedron |
| 5,069,389 A | 12/1991 | Bitsakos |
| 5,143,294 A | 9/1992 | Lintvedt |
| 5,183,206 A | 2/1993 | Gavin |
| 5,203,468 A | 4/1993 | Hsu |
| 5,205,424 A | 4/1993 | Gaspar |
| 5,213,264 A | 5/1993 | Styne |
| 5,213,265 A | 5/1993 | Englhard et al. |
| 5,263,646 A | 11/1993 | McCauley et al. |
| 5,277,343 A | 1/1994 | Parsonage |
| 5,279,461 A | 1/1994 | Darroch |
| 5,332,158 A | 7/1994 | Styne et al. |
| 5,335,858 A | 8/1994 | Dunning et al. |
| 5,346,081 A | 9/1994 | Lin |
| 5,356,076 A | 10/1994 | Bishop |
| 5,375,769 A | 12/1994 | Scultz |
| 5,388,712 A | 2/1995 | Brody |
| 5,413,280 A | 5/1995 | Taylor |
| 5,429,307 A | 7/1995 | Darroch |
| 5,469,993 A | 11/1995 | Hauf et al. |
| 5,484,106 A | 1/1996 | Gilmond |
| 5,499,766 A | 3/1996 | Foster et al. |
| 5,522,547 A | 6/1996 | Dobbs et al. |
| 5,526,985 A | 6/1996 | Martin |
| 5,590,837 A | 1/1997 | Grogan |
| 5,593,094 A | 1/1997 | Barriac et al. |
| 5,595,345 A | 1/1997 | Chura et al. |
| 5,628,461 A | 5/1997 | Foster et al. |

(56) References Cited

U.S. PATENT DOCUMENTS

| | | |
|---|---|---|
| 5,641,125 A | 6/1997 | Martin et al. |
| 5,673,824 A | 10/1997 | Evans |
| 5,678,768 A | 10/1997 | Gager et al. |
| 5,685,487 A | 11/1997 | Ellis |
| 5,727,736 A | 3/1998 | Tryon |
| 5,738,282 A | 4/1998 | Grogan |
| 5,755,384 A | 5/1998 | Foster et al. |
| 5,868,321 A | 2/1999 | Haruch |
| 5,878,959 A | 3/1999 | Smolen, Jr. et al. |
| 5,881,955 A | 3/1999 | Styne |
| 5,890,628 A | 4/1999 | Simpson et al. |
| 5,918,621 A | 7/1999 | Gilmore |
| 5,954,272 A | 9/1999 | Liao |
| 5,964,415 A | 10/1999 | Hadar |
| 5,975,164 A | 11/1999 | Whaley et al. |
| 5,996,858 A | 12/1999 | Tapp et al. |
| 6,126,090 A | 10/2000 | Wadsworth et al. |
| 6,131,774 A | 10/2000 | Thomas et al. |
| 6,170,706 B1 | 1/2001 | Havlovitz |
| 6,186,366 B1 | 2/2001 | Good et al. |
| 6,213,410 B1 | 4/2001 | Spitznagel |
| 6,223,999 B1 | 5/2001 | Lemelshtrich et al. |
| 6,279,773 B1 | 8/2001 | Kiyota |
| D447,791 S | 9/2001 | Robidoux |
| D448,450 S | 9/2001 | Lawson et al. |
| 6,293,294 B1 | 9/2001 | Loeb et al. |
| 6,390,335 B1 | 5/2002 | Lawson et al. |
| D459,438 S | 6/2002 | Knowles |
| 6,402,053 B1 | 6/2002 | Chih |
| 6,415,956 B1 | 7/2002 | Havlovitz |
| 6,419,166 B1 | 7/2002 | Brzezinski et al. |
| 6,422,485 B1 | 7/2002 | Hsu |
| 6,453,953 B1 | 9/2002 | Adriansens et al. |
| 6,536,684 B1 | 3/2003 | Wei |
| 6,546,949 B1 | 4/2003 | Gilmore |
| D476,558 S | 7/2003 | Cho et al. |
| 6,595,437 B1 | 7/2003 | Lawson et al. |
| 6,604,546 B1 | 8/2003 | Gilmore |
| 6,609,733 B2 | 8/2003 | Gilmore |
| 6,612,506 B1 | 9/2003 | Huang |
| 6,712,292 B1 | 3/2004 | Gosis et al. |
| 6,715,698 B2 | 4/2004 | Foster et al. |
| 6,719,216 B2 | 4/2004 | Hubmann et al. |
| 6,726,123 B2 | 4/2004 | Wang |
| D489,970 S | 5/2004 | Nelson et al. |
| 6,749,133 B1 | 6/2004 | Ketcham et al. |
| 6,772,966 B2 | 8/2004 | Foster et al. |
| 6,851,632 B2 | 2/2005 | Ferrazza et al. |
| 6,896,203 B1 | 5/2005 | Restive |
| D507,493 S | 7/2005 | Nelson et al. |
| 6,976,640 B2 | 12/2005 | Chen |
| 6,976,644 B2 | 12/2005 | Troudt |
| 6,978,946 B2 | 12/2005 | Sweeton |
| 6,988,675 B2 | 1/2006 | Hubmann et al. |
| 7,017,833 B2 | 3/2006 | Foster |
| 7,021,571 B1 | 4/2006 | Lawson et al. |
| D524,906 S | 7/2006 | Birrenkott et al. |
| 7,083,125 B2 | 8/2006 | Westphal et al. |
| 7,086,610 B2 | 8/2006 | Hubmann et al. |
| D529,575 S | 10/2006 | Birrenkott et al. |
| 7,118,049 B2 | 10/2006 | Dodd |
| 7,124,962 B1 | 10/2006 | Fryan et al. |
| 7,156,324 B2 | 1/2007 | Birrenkott et al. |
| 7,168,629 B2 | 1/2007 | Timmes et al. |
| 7,168,635 B2 | 1/2007 | Amaduzzi |
| D537,359 S | 2/2007 | Butler et al. |
| 7,182,280 B2 | 2/2007 | Ye et al. |
| D539,142 S | 3/2007 | Butler et al. |
| D559,682 S | 1/2008 | Meeker et al. |
| D561,301 S | 2/2008 | Troyer |
| D569,478 S | 5/2008 | Cichy et al. |
| 7,410,105 B2 * | 8/2008 | Horstman ............... B05B 15/40 239/315 |
| D582,272 S | 12/2008 | Cichy |
| 7,490,783 B2 | 2/2009 | Mueller et al. |
| 7,568,636 B2 * | 8/2009 | Saunders ............ B05B 7/2462 239/443 |
| D619,215 S | 7/2010 | Havlovitz et al. |
| 7,753,288 B2 | 7/2010 | MacLean-Blevins |
| 2004/0007633 A1 | 1/2004 | Simmons |
| 2004/0222246 A1 | 11/2004 | Bates et al. |
| 2005/0035220 A1 | 2/2005 | Brown |
| 2005/0145270 A1 | 7/2005 | Ray |
| 2005/0161530 A1 | 7/2005 | Bartsch et al. |
| 2005/0173452 A1 | 8/2005 | Brown et al. |
| 2006/0169801 A1 | 8/2006 | Zhu et al. |
| 2006/0249593 A1 | 11/2006 | Brown et al. |
| 2006/0255183 A1 | 11/2006 | Burdsall et al. |
| 2007/0125878 A1 | 6/2007 | Hahn et al. |
| 2007/0170285 A1 | 7/2007 | Schouten |
| 2007/0228187 A1 | 10/2007 | Nelson et al. |
| 2008/0011882 A1 | 1/2008 | Foster et al. |
| 2008/0179420 A1 | 7/2008 | Hubmann et al. |
| 2010/0044454 A1 | 2/2010 | Karazniewicz |

FOREIGN PATENT DOCUMENTS

| | | |
|---|---|---|
| EP | 0 798 158 | 10/1997 |
| EP | 1 022 060 | 7/2000 |
| EP | 1 305 055 | 5/2003 |
| EP | 1 602 199 | 12/2005 |
| FR | 2 708 569 | 2/1995 |
| GB | 1 329 788 | 6/1973 |
| GB | 1 386 186 | 3/1975 |
| GB | 2 018 626 | 10/1979 |
| GB | 2 286 109 | 8/1995 |
| WO | WO 2002/009783 | 2/2002 |

OTHER PUBLICATIONS

International Search Report for International Patent Application No. PCT/US2006/026119 dated Jan. 5, 2007.
Supplementary European Search Report for European Application No. 06 77 4502 dated Jan. 5, 2009.
Air Wick Odor Stop Product Promotion retrieved from the Internet at www.winwithairwick.co.nz/airwick_entry_form.pdf (2006).
International Search Report with Written Report from PCT/2012/027228; dated Jun. 6, 2012.
International Preliminary Report on Patentability, with Transmittal Letter, dated Mar. 27, 2014 for PCT/US2012/027228.

* cited by examiner

READY-TO-USE HOSE END SPRAYER

RELATED APPLICATIONS

This application is a continuation of U.S. patent application Ser. No. 15/969,150, filed May 2, 2018, which is a continuation of U.S. patent application Ser. No. 14/577,225, filed on Dec. 19, 2014, now U.S. Pat. No. 9,980,430, issued May 29, 2018, which is a continuation of U.S. patent application Ser. No. 13/038,062, filed on Mar. 1, 2011, each of which are hereby incorporated by reference in their entirety.

BACKGROUND

1. Field of the Art

The technology relates to a sprayer, and more particularly to a hose-end sprayer that can dispense ready-to-use liquid products, such as fertilizer compositions or pesticide (e.g., herbicides, fungicides, and insecticides) compositions.

2. Description of Related Art

There are many known spray devices for dispensing chemicals or other products to maintain lawns, gardens, yards, trees, shrubs, or plants. Most spray devices provide ready-to-use ("RTU") liquids, such as fertilizers, herbicides, insecticides, and fungicides, which can be dispensed directly from the spray device in a variety of spray patterns.

Most conventional hose-end sprayers have a grip area "in-line" with a sprayer nozzle and a connector for connecting the sprayer to a garden hose and a sprayer nozzle (i.e., a central axis of the grip area is substantially parallel to, and substantially in the same plane as that shared by the central axis of the sprayer nozzle and the central axis of the garden hose connector). This configuration often results in several problems. For example, in order to hold the sprayer in a steady position, especially when directing the spray at close target areas, users may need to exert greater than ordinary gripping force to counteract the kick-back force of the spray exiting the sprayer nozzle. Furthermore, sprayers having a grip area in-line with an attachment means to a garden hose are susceptible to poor connections between the garden hose connector and the garden hose. Such poor connections may result following wear and tear to the garden hose (e.g., damage to a threaded connection at the end of the garden hose inflicted by a user dropping the garden hose onto a driveway, driving over the garden hose, etc.), which, in turn, may result in water leaking from the poor connection. Because of the physical configuration of these conventional sprayers, which have the grip area in-line with a connector for connecting the sprayer to a garden hose, when water leaks from the sprayer at the poor connection, it does so oftentimes onto the hand of the user. Water leaking onto the hand of a user may be inconvenient or unpleasant for the user. Moreover, a user may mistakenly perceive the leaking water to contain a chemical product, causing the user to have unnecessary concerns about health or safety.

Other drawbacks also exist with conventional sprayers. For instance, sprayers with rotatable valves (e.g., valves located on the side or the top of a sprayer housing) require two hands for operation. One hand is required to hold the sprayer, while the other hand controls the rotatable valve located on the side of the sprayer. Additionally, many sprayers currently found on the market today couple a chemical container to a sprayer housing with a threaded connection. Assembling products having this type of connection demands added steps in the manufacturing process, which leads to added manufacturing costs. These and other problems are known to exist with conventional sprayers.

Notwithstanding the number of spray devices that currently exist, most fail to provide a reliable, user-friendly device that is cost-effective to manufacture, easy to use, and safe for a user to operate. Embodiments of the present invention, as demonstrated by the several exemplary embodiments described herein, provides a ready-to-use hose-end sprayer with beneficial features that achieve improved functionality over conventional sprayers. The sprayer according to embodiments of the present invention combines numerous advantages including: (1) a housing forming a grip area that is not "in-line" with the sprayer nozzle and the garden hose connector, thus positioning the grip area within a horizontal plane below a separate horizontal plane containing the sprayer nozzle but above a further separate horizontal plane containing the garden hose connector, and reducing the chance that a user will be exposed to water or other liquid leaking from the housing (e.g., at the connection between the garden hose connector and the garden hose); (2) a pivot switch, operable for example by a user's thumb, located on the exterior portion of the sprayer's housing that enables a user to both hold the sprayer and control the flow of liquid through the sprayer, all with one hand; (3) an internal connection between the device's conduits that creates a vacuum to enable precise dilution/mixing of a substance liquid with a carrier liquid; and (4) a snap-fit connection between the housing and the container to improve cost-effectiveness of the manufacturing process and to more securely couple the housing to the container.

The description herein of certain advantages and disadvantages of known methods and devices is not intended to limit the scope of the present invention. Indeed, the exemplary embodiments may include some or all of the features described above without suffering from the same disadvantages.

SUMMARY

In accordance with one embodiment, a sprayer is provided having a housing forming a grip area and with a sprayer head, a carrier liquid conduit, a substance liquid conduit, a main chamber, a carrier liquid receiving port and a pivot switch. The pivot switch allows a user to control and activate the various operating modes of the sprayer, which may include, for example, controlling the liquid flow or the particular dilution/mixing of the carrier liquid and the substance liquid sprayed out of the nozzle.

In accordance with another exemplary embodiment, a device for controlling the mixture of a carrier liquid and a substance liquid in a sprayer is provided having a main chamber, a first conduit, and a second conduit. The main chamber is coupled to a pivot switch, allowing a user to control and activate the various operating modes of the sprayer. Exemplary operating modes include an ON position, an OFF position and a WATER position.

BRIEF DESCRIPTION OF THE DRAWINGS

Purposes and advantages of the exemplary embodiments will be apparent to those of ordinary skill in the art from the following detailed description together with the appended drawings, where like reference numerals are used to indicate like elements.

Figure 1:
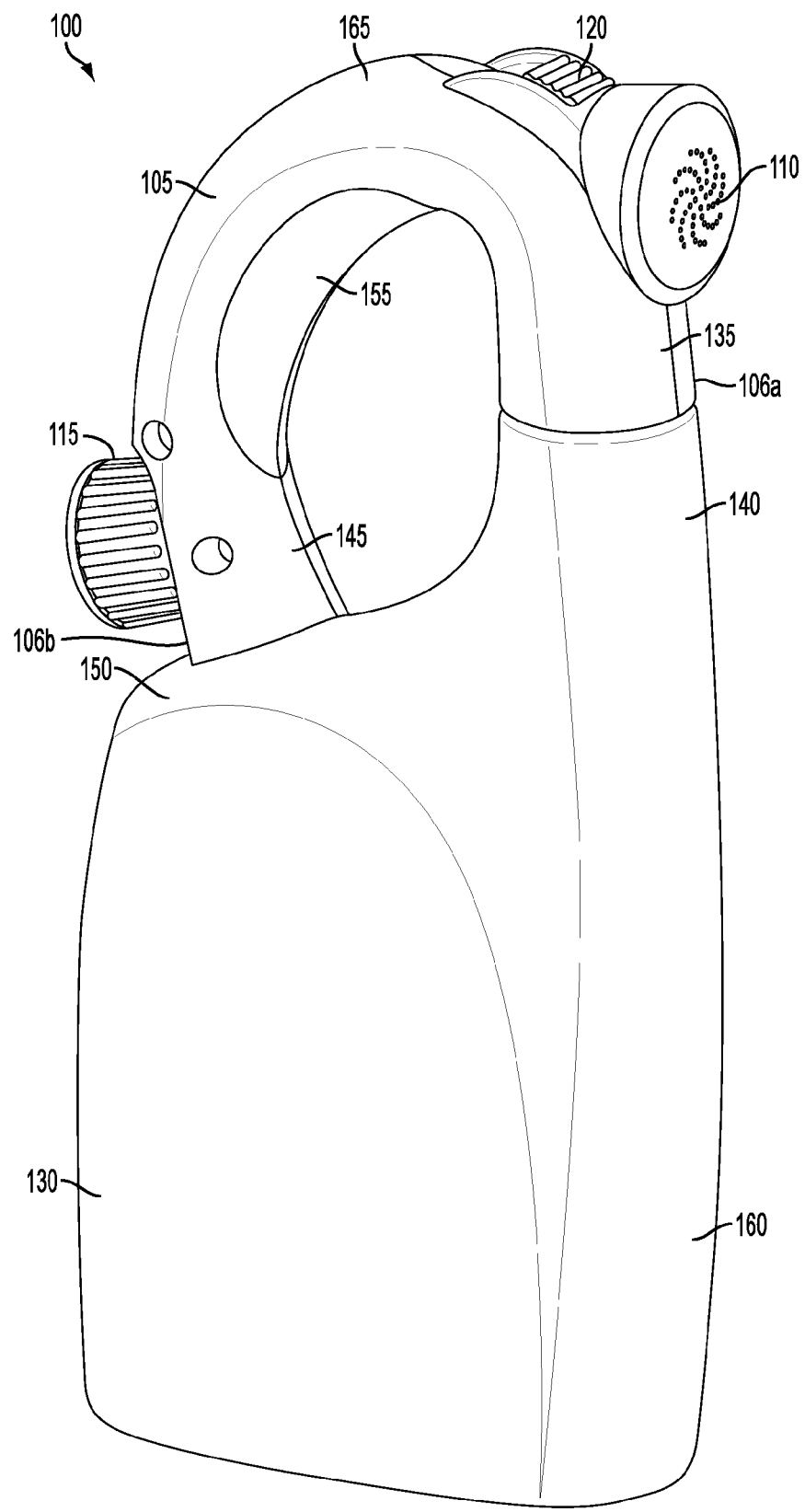
FIG. 1 depicts a perspective view of a sprayer in accordance with an exemplary embodiment.

These and other exemplary embodiments and advantages will become apparent from the following detailed description, taken in conjunction with the accompanying drawings, illustrating by way of example the principles of the various exemplary embodiments.

DETAILED DESCRIPTION

The following description is intended to convey a thorough understanding of the embodiments by providing a number of specific embodiments and details involving a product sprayer. It is understood, however, that the invention is not limited to these specific embodiments and details, which are exemplary only. It is further understood that one possessing ordinary skill in the art, in light of known devices, systems and methods, would appreciate the use of the invention for its intended purposes and benefits in any number of alternative embodiments.

Terminology used for describing particular embodiments is not intended to limit the scope of an exemplary embodiment. As used throughout this disclosure, the singular forms "a," "an," and "the" include the plural, unless the context clearly dictates otherwise. Thus, for example, a reference to a "conduit" includes a plurality of conduits, or other equivalents or variations know to those skilled in the art. Furthermore, if in describing some embodiments or features permissive language (e.g., "may") is used, that does not suggest that embodiments or features described using other language (e.g., "is," "are") are required. Unless defined otherwise, all terms have the same commonly understood meaning that one of ordinary skill in the art to which this invention belongs would expect them to have.

The accompanying figures and following description depict and describe exemplary embodiments of a sprayer for discharging liquid. As used throughout this description, the term "sprayer" or other like terms are meant to encompass a structure adapted to discharge, dispense, project, spray, etc., liquid. In exemplary embodiments the liquid to be discharged may be a fertilizer, a pesticide (e.g. herbicide, insecticide, fungicide, etc.) or combinations thereof. It should be appreciated, however, that the exemplary embodiments of the sprayer described throughout are not limited to any specific embodiment or detail that is disclosed. Moreover, one of ordinary skill in the art will appreciate the use of the exemplary embodiments for their intended purposes and benefits in a number of alternative embodiments as required by specific design or other needs.

With regard to the exemplary embodiments of the sprayer described below, any part that fastens, mounts, attaches, or connects any component to form the sprayer shall not be limited to any particular type and is instead intended to encompass all known and conventional fasteners like screws, nut and bolt connectors, threaded connectors, snap rings, detent arrangements, clamps, rivets, toggles, etc. Fastening may also be accomplished by other known fitments like leak-tight seals or sealing devices. Components may also be connected by adhesives, glues, welding, ultrasonic welding, and friction fitting or deformation. Of course, combinations of these fitment systems might be used.

Unless otherwise specifically disclosed, materials for making components of the present invention may be selected from appropriate materials, such as metal, metal alloys, natural or manmade fibers, composites, vinyl, plastics, silicone, rubber, and so on. Any and all appropriate manufacturing or production methods, such as casting, pressing, extruding, molding, or machining may be used to construct the exemplary embodiments or their components.

Lastly, when describing exemplary embodiments of the sprayer, any reference to front and back or rear, top and bottom, right and left, upper and lower, etc., is intended for the convenience of describing such embodiments only. Such references do not limit the exemplary embodiments or its components to any specific positional or spacial orientation.

Exemplary embodiments of the sprayer will now be described more fully with reference to the accompanying drawings, in which some, but not all, embodiments are illustrated.

With reference to FIGS. 1-3b, exemplary embodiments of a sprayer in accordance with the present invention are shown. Each of the exemplary embodiments generally includes a pivot switch that allows a user to control and active the various operating mode of the sprayer, which may include, for example, controlling the liquid flow or the particular dilution/mixing of the carrier liquid and the substance liquid sprayed out of the nozzle. Each of the exemplary embodiments also generally includes a sprayer housing which forms a curved and ergonomic grip area. Generally, each of the embodiments may also include an adjustable or nonadjustable nozzle assembly for discharging liquid from the housing. Furthermore, the exemplary embodiments generally include a nozzle, a carrier liquid receiving port, and a grip area that are not "in-line." Additionally, each of the embodiments may also include a snap-fit mechanism for securely and efficiently attaching a container to the housing. Each of these parts generally referred to here will be described in more detail below.

FIG. 1 illustrates an exemplary embodiment of a sprayer 100. It should be appreciated that all of the figures herein illustrate a simplified view of an exemplary sprayer 100, and its components, and that sprayer 100 may include additional elements that are not depicted. The sprayer 100 may generally have a housing 105 and a container 130. The housing may have a front portion 135, a rear portion 145, a top portion 165, and a grip portion 155. The housing may also have a nozzle 110, a carrier liquid receiving port 115, and a pivot switch 120. The container may have a base 160, a rear portion 150, and a front portion 140. Generally, the sprayer 100 may be configured such that the rear portion 145 of housing 105 may be attached to the rear portion 150 of container 130. The sprayer 100 may also be configured such that the front portion 135 of the housing 105 may be attached to the front portion 140 of the container 130. The container 130 may be removably connected to the front portion 135 in any appropriate manner, like through threaded connectors, snap rings, detent arrangements, etc. In one embodiment, the front portion 140 of container 130 may snap into an appropriate receiving port located inside of the front portion 135 of the housing 105. In another exemplary embodiment, the rear portion 150 of container 130 may snap into an appropriate receiving mechanism located on the rear portion 145 of the housing 105. Other exemplary embodiments for attaching housing 105 to container 130 include threaded connections, snap rings, detent arrangements, etc. In an exemplary embodiment, the container 130 may be permanently connected to the housing 105. In other embodiments, the container 130 and the housing 105 may form a single structure.

The container 130 may be configured in any number of ways. In an exemplary embodiment, container 130 may have a base 160, a front portion 140, and a rear portion 150. Front portion 140 may extend higher than rear portion 150. In another exemplary embodiment, container 130 may have an opening at front portion 140. Overall, the container 130 may define a hollow compartment to store ready-to-use ("RTU") liquid products, such as fertilizers, pesticides (e.g., herbicides, insecticides, fungicides, etc.), and combinations thereof. The container 130 may also be translucent in order to monitor the RTU liquid levels.

The housing 105 forming a grip area 155 may be ergonomically shaped to allow a user to comfortably grasp the sprayer 100. In an exemplary embodiment, at least a portion of the surface of the housing 105 may be arcuate in shape to form a curved grip area. In another exemplary embodiment, the grip area 155 may be generally located below the nozzle 110, but above the carrier liquid receiving port 115. Furthermore, the grip area 155, the nozzle 110, and the carrier liquid receiving port 115 may not be "in-line" with one-another. More particularly, for example, a centroid (not shown) of the grip area 155 may be within a first horizontal plane (not shown) that is below a separate second horizontal plane (not shown) containing a centroid (not shown) of the nozzle 110, but that is above a separate third horizontal plane (not shown) containing a centroid (not shown) of the carrier liquid receiving port 115. In other exemplary embodiments, the grip area 155 may include one or more ergonomic gripping pads or grooves (not shown). The gripping pads or grooves (not shown) may be shaped to accommodate the natural orientation of a user's grip. In one embodiment, the gripping pads or grooves (not shown) may extend along the entire grip area 155 in a substantially elongated shape. The gripping pads or grooves (not shown) may have a varied length and width. The size and shape of gripping pads or grooves (not shown) may also be changed to conform to the various designs of housing 105 and grip area 155.

Moreover, the housing 105 may also include a nozzle 110, a carrier liquid receiving port 115, and a pivot switch 120. The nozzle 110 may be located within the front portion 135 of housing 105. The nozzle 110 may be constructed to spray liquid in any number of ways, according to any number of patterns. For example, the nozzle 110 may spray liquid in a fan, jet, or shower pattern. In an exemplary embodiment, the nozzle 110 may be adjustable to permit a user to change the liquid spray patterns by twisting the nozzle 110. In other exemplary embodiments, the nozzle 110 may be adjustable to control the pressure of the liquid flow through the nozzle 110. The nozzle 110 may regulate the spray flow, droplet size, and spray pattern of liquid as it is discharged from the sprayer 100. The nozzle 110 may be adapted to discharge liquid in a spray pattern ranging from a stream jet pattern to a full-cone pattern, to maximize coverage for dispensing liquid product. It should be appreciated that nozzle 110 may be configured in any number of ways to support any number of applications.

The carrier liquid receiving port 115 may be located at the rear portion 145 of housing 105. Carrier liquid receiving port 115 may be configured to receive a carrier liquid from a carrier liquid source (not shown) in any number of ways. In an exemplary embodiment, a garden hose may be securely screwed into the carrier liquid receiving port 115 through a threaded connector. In another exemplary embodiment, the carrier liquid receiving port 115 may have a threaded and rotatable outer portion. In this exemplary embodiment, the threaded and rotatable outer portion of carrier liquid receiving port 115 may be securely screwed around the threads of a carrier liquid source, such as a conventional garden hose. Carrier liquid receiving port 115 may be removably connected to a carrier liquid source (not shown), which may be, for example, a garden hose, in any appropriate manner, such as threaded connectors, snap rings, detent arrangements, etc. In another embodiment, the carrier liquid receiving port 115 may be connected to the rear portion 145 of housing 105 through a ball-and-socket type arrangement. Such an arrangement allows the carrier receiving port 115 to move in relation to the movement or pull of a garden hose, thereby relieving the stress on the connection of the garden hose to the sprayer. In another exemplary embodiment, the carrier liquid receiving port 115 may have a locking mechanism to reduce the left/right and up/down whip of the sprayer when coupled to a garden hose.

Pivot switch 120 may be located such that at least a portion of the pivot switch 120 is available on the exterior of the housing 105. In one embodiment, pivot switch 120 may be located such that at least a portion of the pivot switch 120 is available on the on the top portion 165 of the housing 105. The location of the pivot switch 120 and the grip area 155 of housing 105 may be positioned so that a user may grip the grip area 155 and control the pivot switch 120 with one hand. In an exemplary embodiment, the pivot switch 120 may include one or more gripping pads or grooves. These pads or grooves may be ergonomically designed in order to allow the user to easily and comfortably control the pivot switch 120 when operating the sprayer 100.

The pivot switch 120 may allow a user to control and/or activate the various operating modes of the sprayer 100. In one embodiment, pivot switch 120 may allow a user to control the flow of carrier liquid entering the housing 105 through the carrier liquid receiving port 115, and/or the dilution or mixing of the carrier liquid with the substance liquid entering the housing 105 from container 130, which mixed liquid may then ultimately exit sprayer 100 through nozzle 110.

In another exemplary embodiment, the pivot switch 120 may be dynamically positioned by a user to operate the sprayer 100 in any number of operating positions. In one embodiment, one or more operating positions are predetermined by the manufacturer. For example, the pivot switch 120 may have an "OFF" position, an "ON" position, and a "WATER" position. OFF may correspond to an operating position at which no liquid is sprayed out of the nozzle 110. WATER may correspond to an operating position where only a carrier liquid (e.g., water from a garden hose) flows through the sprayer 100 and out of the nozzle 110. ON may generally correspond to an operating position at which both the carrier liquid and the substance liquid (from the container 130) flow through sprayer 100 and out of the nozzle 110. WATER may correspond to an operating position at which only a carrier liquid (e.g., water from a garden hose) flows through the sprayer 100 and out of the nozzle 110. In a further example, the pivot switch 120 may have only an "OFF" position and an "ON" position. Generally, the aforementioned exemplary operating positions are attainable by a user moving the pivot switch 120 from one operating position to another. In an exemplary embodiment, the aforementioned exemplary operating positions are easily attainable by virtue of a user moving the pivot switch 120 without undue force being required or a significant impediment being provided to such moving. For example, a user, while grasping the sprayer 100 at the grip area 155 with one hand, may move the pivot switch 120 with the thumb of the user's same hand. However, in accordance with an exemplary embodiment of this invention, a safety feature (not shown) may be provided to present a structural impediment to the sliding of the pivot switch 120, and, thereby, greatly reducing the likelihood of inadvertent sliding of the pivot switch 120 (e.g., by a child).

FIGS. 2(a), 2(b), 2(c), and 2(d) illustrate a cross sectional view of sprayer 100. Generally, the housing 105 may have a number of internal components, including, but not limited to, a carrier liquid conduit 205, a substance liquid conduit 225, a main chamber 215, a carrier liquid inlet 210, a substance liquid inlet 220, and a pivot arm 230.

Figure 2A:
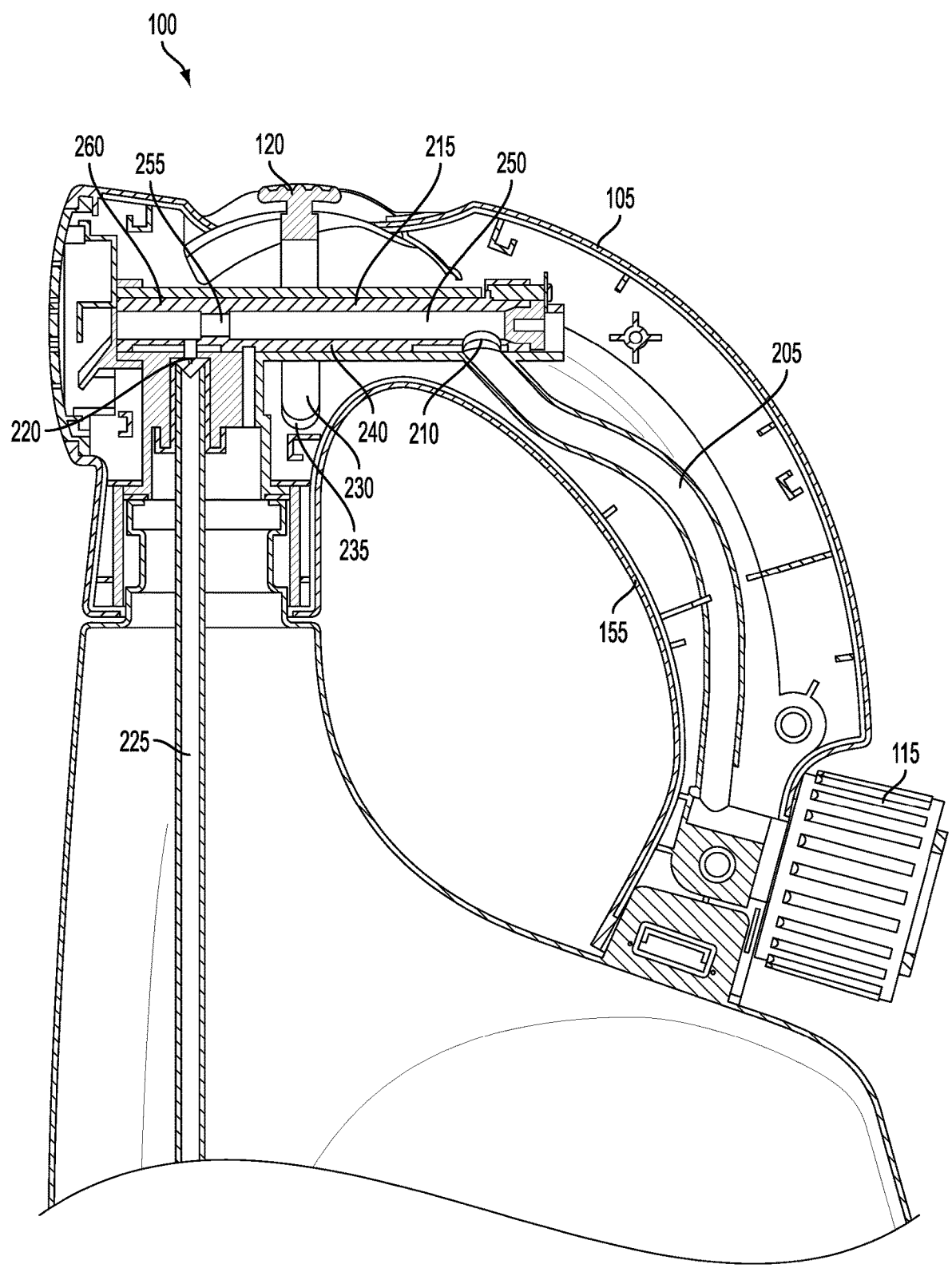
FIG. 2(a) is a cross-sectional view of a sprayer housing, in accordance with an exemplary embodiment.
Figure 2B:
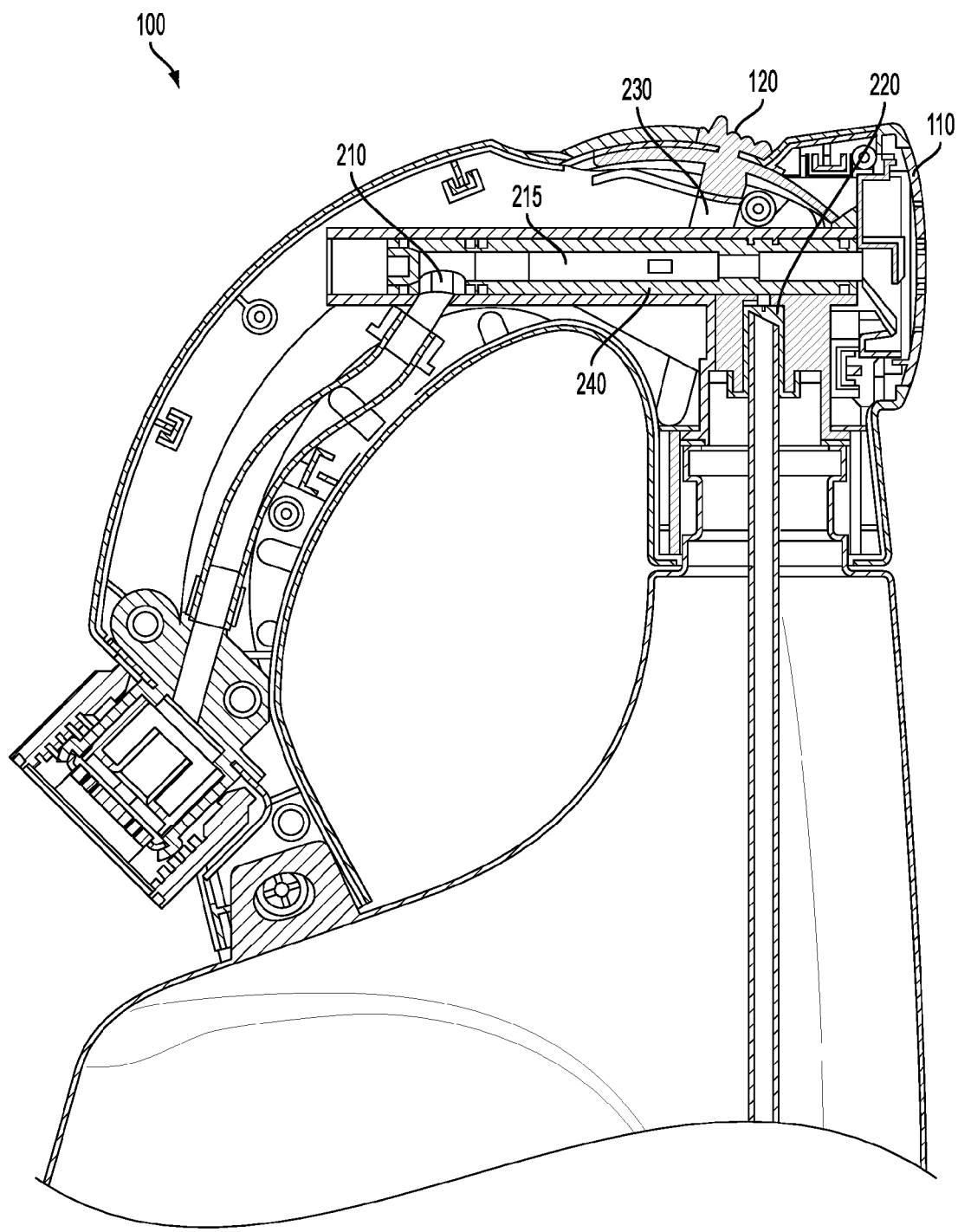
FIG. 2(b) is a cross-sectional view of a sprayer housing, operating in an ON mode.
Figure 2C:
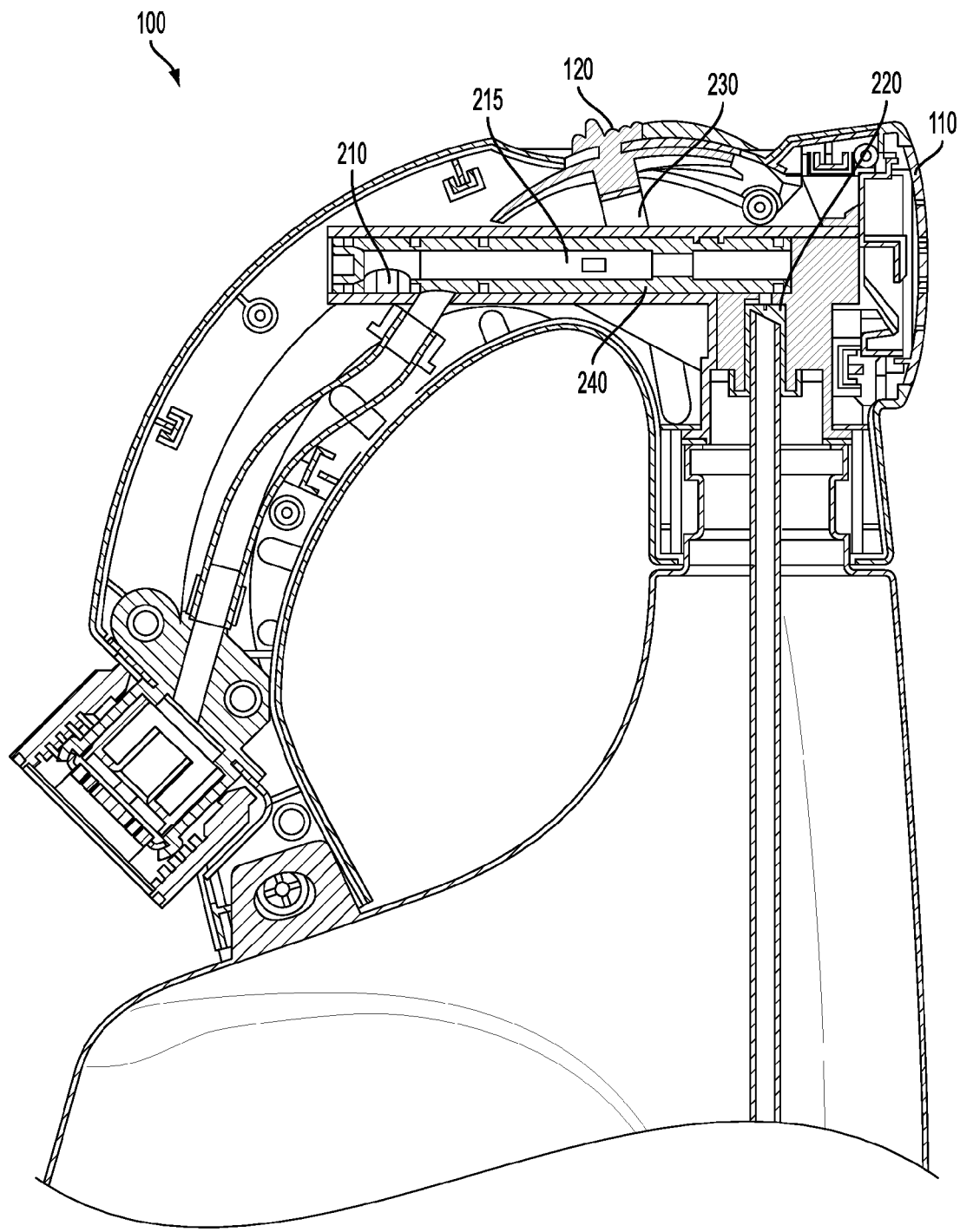
FIG. 2(c) is a cross-sectional view of a sprayer housing, operating in an OFF mode.
Figure 2D:
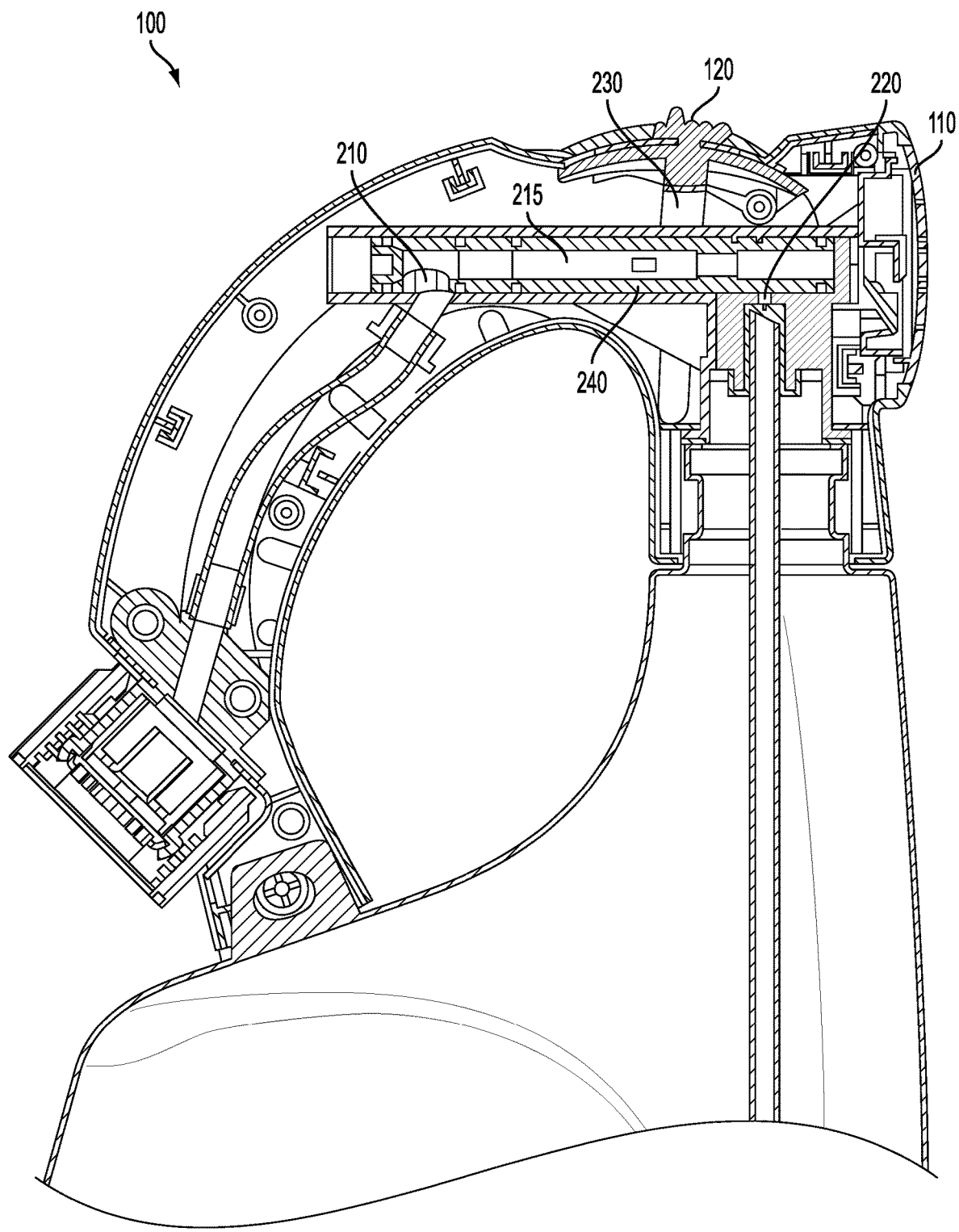
FIG. 2(d) is a cross-section view of a sprayer housing, operating in a WATER mode.

Referring to FIG. 2(a), carrier liquid conduit 205 may be located entirely within housing 105. In an exemplary embodiment, carrier liquid conduit 205 may extend through housing 105 along the grip area 155 of housing 105. At one end, carrier liquid conduit 205 may be coupled to carrier liquid receiving port 115. On the other end, carrier liquid conduit 205 may be coupled to carrier liquid inlet 210. Carrier liquid conduit 205 may be made of any number of suitable materials and may be connected to carrier liquid receiving port 115 and carrier liquid inlet 210 in any number of suitable ways to form a fluid connection.

Substance liquid conduit 225 may, at one end, be coupled to substance liquid inlet 220. At the other end, substance liquid conduit 225 may extend into container 130. In an exemplary embodiment, substance liquid conduit 225 may extend through the connection between the front portion 135 of housing 105 and the front portion 140 of container 130. In other exemplary embodiments, substance liquid conduit 225 may extend into container 130 through any other connection point between housing 105 and container 130. Substance liquid conduit 225 may extend into the container 130 and may terminate near a bottom surface of container 130. In an exemplary embodiment, substance liquid conduit 225 may be a dip tube of a standard length and width. Of course, those with skill in the art will understand that the length and width of substance liquid conduit 225 may be adjusted in any number of ways to support any number of applications. It should also be appreciated that, in an exemplary embodiment, the substance liquid conduit 225 may be generally perpendicular to the main chamber 215. In a further exemplary embodiment, carrier liquid inlet 210 may have a diameter of about 7.50 mm and substance liquid inlet 220 may have a diameter of about 1.41 mm.

Carrier liquid inlet 210 and substance liquid inlet 220 may be formed within a main chamber housing 240. The main chamber housing 240 may be generally cylindrical and have a main chamber 215 that operates to move within the main chamber housing 240. The main chamber 215 may be generally tubular, having an outer wall surrounding an interior chamber. The main chamber 215 may have a first and second aperture to provide fluid communication with carrier liquid conduit 205 and substance liquid conduit 225 via carrier liquid inlet 210 and substance liquid inlet 220. When in the appropriate operating position, carrier liquid entering main chamber 215 through carrier liquid inlet 210 may mix with substance liquid entering main chamber 215 through substance liquid inlet 220. The mixed liquid may then be discharged from main chamber 215 and ultimately exist the sprayer through nozzle 110.

A pivot arm 230 may be coupled to the main chamber 215 in a manner sufficient to translate movement of the pivot switch 120 to the main chamber 215, and thereby, control the position of main chamber 215 within main chamber housing 240 according to the position of pivot switch 120. The position of main chamber 215 relative to carrier liquid inlet 210 and substance liquid inlet 220 may affect the flow and mix of carrier liquid and substance liquid into the main chamber 215. The pivot arm 230 may be pivotally connected to a pivot axis 235 within housing 105. In other exemplary embodiments, the pivot axis 235 may be located anywhere along the pivot arm 230. For example, the pivot axis 235 may be located at a point within the housing 105 that is below a horizontal plane occupied by the main chamber housing 240. Furthermore, the pivot arm 230 may also be connected to the pivot switch 120. In this configuration, the pivot switch 120 travels along an arc as it moves between the various operating positions of the sprayer 100. Such a configuration may offer benefits to a user, as the arcuate movement provides enhanced leverage for the user as he or she moves the pivot switch 120 between the various operating positions of the sprayer 100. Further, the arcuate travel path of pivot switch 120 allows the user to effect movement of main chamber 215 with minimal effort and also helps to ensure that main chamber 215 is fully extended into the appropriate operating position. Moreover, such a configuration may be more efficient from a product design perspective, as the arcuate movement enables a range of travel for the main chamber 215 that is greater than the range of travel that would be possible, in a predetermined amount of space within the housing 105, if provided by movement of a switch or comparable actuator traveling in a linear or longitudinal direction relative to the travel of the main chamber 215, such as that which may be found in certain existing sprayers. Consequently, in contrast to such existing sprayers, the housing 105 of an embodiment of the present invention may be more ergonomically shaped, such as having a curved grip area, and may take the form of a more aesthetically appealing industrial design, while achieving the necessary and desired functionality for carrier liquid and substance liquid flow control and mixing provided by the components contained within the housing 105. The pivot switch 120, the pivot arm 230, and the main chamber 215 may be operatively coupled to one another to permit a user to control the flow and/or the dilution or mixing of carrier liquid and substance liquid into main chamber 215 by adjusting the position of pivot switch 120, and, in turn, the position of main chamber 215. For example, the main chamber 215 may have two apertures which correspond to inlets 210 and 220. Therefore, in one operating mode, the opening of main chamber 215 may align with inlets 210 and 220 such that liquid from carrier liquid conduit 205 and substance liquid conduit 225 through the openings and into main chamber 215. Adjusting the position of pivot switch 120 may affect the position of main chamber 215 such that the openings are not positioned over inlets 210 and 220, thereby causing the outer wall of the main chamber to block the flow of liquid through inlets 210 and 220. In this exemplary embodiment, no liquid will flow through the nozzle 110.

Of course, the pivot switch 120 may be adjusted to a position where the main chamber 215 is positioned so that inlets 210 and 220 are only partially covered by the outer wall of main chamber 215. In this exemplary embodiment, the flow of liquid from carrier liquid conduit 205 and substance liquid conduit 225 into main chamber 215 is restricted, but not completely prevented. In other exemplary embodiments, main chamber 215 may cover inlet 220, but not inlet 210. In this exemplary embodiment, only carrier liquid, and not substance liquid, will pass into main chamber 215 and through nozzle 110. Those with skill in the art will appreciate that the length and position of inlets 210 and 220, as well as the length and position of the inlets on main chamber 215, may be adjusted to support a number of varying preferences for controlling the mixing and dilution of carrier liquid and substance liquid within the main chamber 215.

In one exemplary embodiment, carrier liquid inlet 210 may be located on a bottom portion of main chamber 215 so that liquid passing through carrier liquid conduit 210 may enter directly into the main chamber 215 through an opening in the main chamber at carrier inlet 210. In another exemplary embodiment, the main chamber 215 may have a hollow end, wherein the carrier liquid conduit 205 may be positioned such that carrier liquid will pass directly into the hollow end of the main chamber when the sprayer is in the appropriate operating position. In an exemplary embodiment, the main chamber 215 may have two chamber inlets which, when properly aligned with carrier liquid inlet 210 and substance liquid inlet 220 allow for liquid to pass from carrier liquid conduit 205 and the substance liquid conduit 225 into the central region of the main chamber 215. In another exemplary embodiment, the main chamber may be configured to cover carrier liquid inlet 210 and substance liquid inlet 220 such that the outer portion of main chamber 215 covers the inlets, thus preventing the flow of liquid to the inside of mixing chamber 215.

The main chamber 215 may comprise three sub-chambers, each having various dimensions. In an exemplary embodiment, main chamber 215 may comprise rear chamber 250, middle chamber 255, and front chamber 260. Each of the sub-chambers 250, 255, and 260 may be configured in any number of ways to affect the desired mixing and liquid flow rates through the main chamber 215 and out of the nozzle 110. In one exemplary embodiment, the middle chamber 255 may be narrower than the rear chamber 250 and the front chamber 260, thereby causing carrier liquid turbulence as the carrier liquid passes over the substance liquid inlet 220. In another exemplary embodiment, the rear chamber may have a diameter of about 4.3 mm (plus draft), the middle chamber 255 may have a diameter of about 3.20 mm, and the front chamber 260 may have a diameter of about 4.45 mm (plus draft).

Substance liquid may be drawn through substance liquid conduit 225 in an aspiration-type manner. In one exemplary embodiment, carrier liquid passing through main chamber 215 may create a pressure differential between the substance liquid in container 130 and the carrier liquid in main chamber 215. This pressure differential may cause substance liquid to be drawn (e.g., by vacuum or suction) through substance liquid conduit 225 to the main chamber 215. In an exemplary embodiment, the amount of substance liquid drawn through substance liquid conduit 225 is controlled by affecting the flow of carrier liquid into main chamber 215.

FIG. 2(*b*) depicts sprayer 100 operating in an exemplary ON mode. In this exemplary embodiment, the pivot switch 120, pivot arm 230, and main chamber 215 are extended to a forward position, toward the nozzle 110. In this embodiment, the main chamber 215 does not cover the inlets 210 and 220, thereby permitting a full flow of carrier liquid and substance liquid into main chamber 215.

FIG. 2(*c*) depicts sprayer 100 operating in an exemplary OFF mode. In this exemplary embodiment, the pivot switch 120, pivot arm 230, and main chamber 215 are extended to a back position, away from the nozzle 110. In this embodiment, the main chamber 215 completely covers the inlets 210 and 220, thereby preventing any flow of carrier liquid and substance liquid into main chamber 215.

FIG. 2(*d*) depicts sprayer 100 operating in an exemplary WATER mode. In this exemplary embodiment, the pivot switch 120, pivot arm 230, and main chamber 215 operate in a neutral position. In this embodiment, the main chamber 215 completely covers substance liquid inlet 210, but does not cover carrier liquid inlet 220, thereby permitting the flow of only carrier liquid into main chamber 215.

Referring now to FIGS. 2(*b*), 2(*c*) and 2(*d*), it should be understood that pivot switch 120, pivot arm 230 and main chamber 215 may be configured in any number of ways to control the flow of liquid into main chamber 215. For instance, these components may be configured such that the sprayer 100 operates in an ON position when the valve slide is extended to a back position, away from the nozzle 110. In another exemplary embodiment, the components may be configured such that the sprayer operates in a WATER position when the valve slide is extended to a forward position, toward the nozzle 110. Those with skill in the art will understand that the configuration of pivot switch 120, pivot arm 230, main chamber 215, and inlets 210 and 220 may be configured in any number of ways to support any number of desired operating positions.

FIG. 3(*a*) depicts a cross section view of the connection between an exemplary sprayer housing 105 and a sprayer container 130. In particular, FIG. 3*a* depicts a connection mechanism for coupling housing 105 to container 130. Generally, the container 130 may have a number of components to aid coupling, including, but not limited to, a container opening 305, a collar member 310, a collar protrusion 335, and a latch base 315. Furthermore, the housing 105 may also have a number of components to aid coupling, including a latch 320, a receiving port 325, and a receiving groove 330.

Still referring to FIG. 3(*a*), the housing 105 may be configured to attach to container 130 at two separate connection points. The receiving port 325 may have a receiving groove 330 along the inside circumference of receiving port 325. The receiving groove 330 may allow for the collar member 310 of container 130, which has a corresponding collar protrusion 335, to be snap- or friction-fitted into the receiving groove 330 of receiving port 325.

The receiving port 325 and the collar member 310 may be configured in a number of ways. In an exemplary embodiment, the receiving port 325 may be configured to permanently hold collar member 310 once a connection is made. In another embodiment, receiving port 325 and collar member 310 may be removably connected. In this exemplary embodiment, housing 105 may be re-used and re-coupled to other containers having a collar member similar to collar member 310.

The housing 105 may also be coupled to container 130 by latch base 315 and latch 320. For example, as shown in FIG. 3(*a*), container 130 may have a latch base 315 that extends upward from the base of container 130 to form an open for latch 320 to connect.

In an exemplary embodiment, the collar member 310 may be threaded in part to allow a standard bottle cap (not shown) to fit over the collar member 310 when container 130 is not coupled to housing 105. In other exemplary embodiments, collar member 310 may be configured so that a standard snap-fit cap may fit over collar member 310 when container 130 is not coupled to housing 105.

Figure 3A:
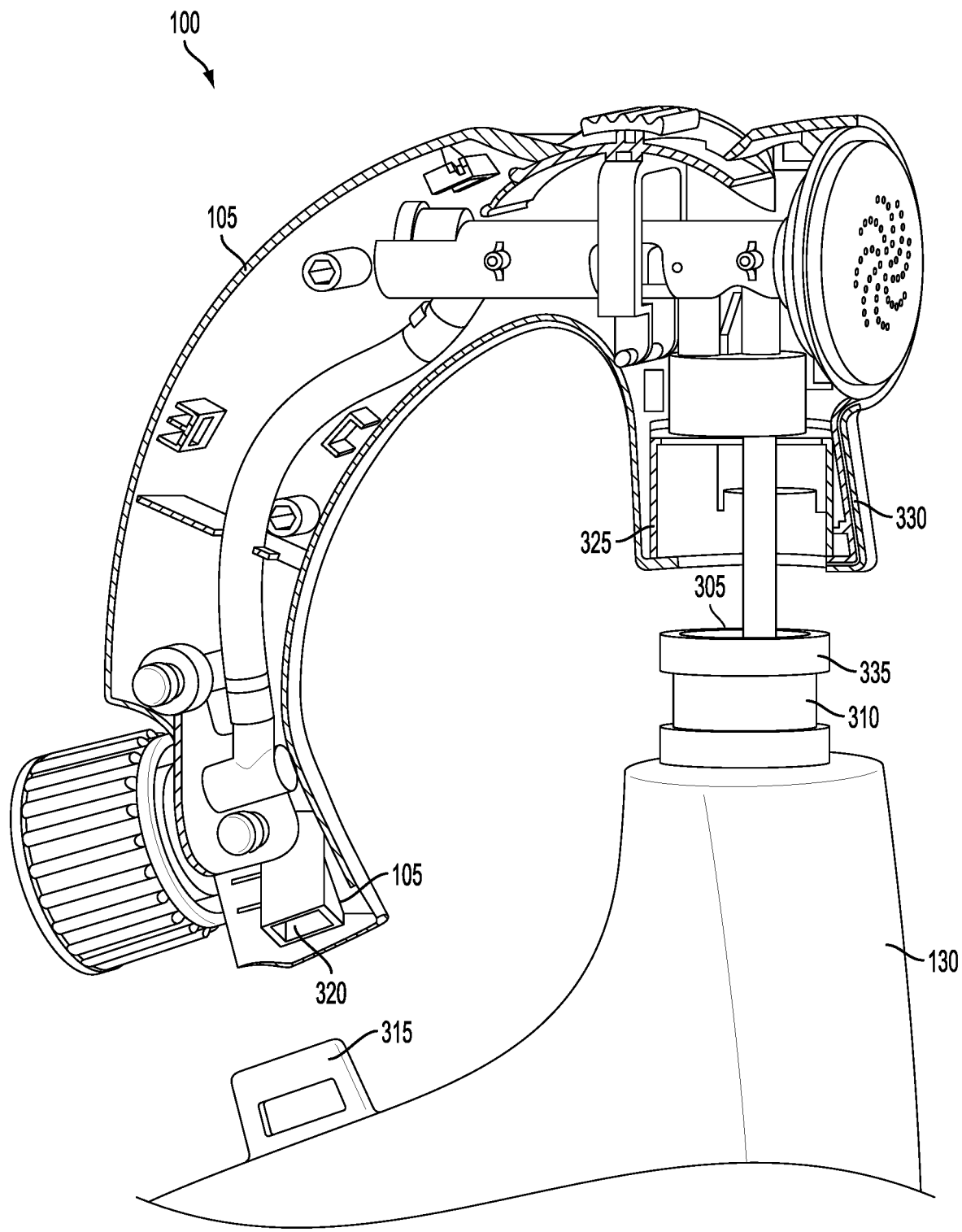
FIG. 3(a) is a perspective view of an exemplary embodiment of a mechanism for coupling a sprayer housing to a container.
Figure 3B:
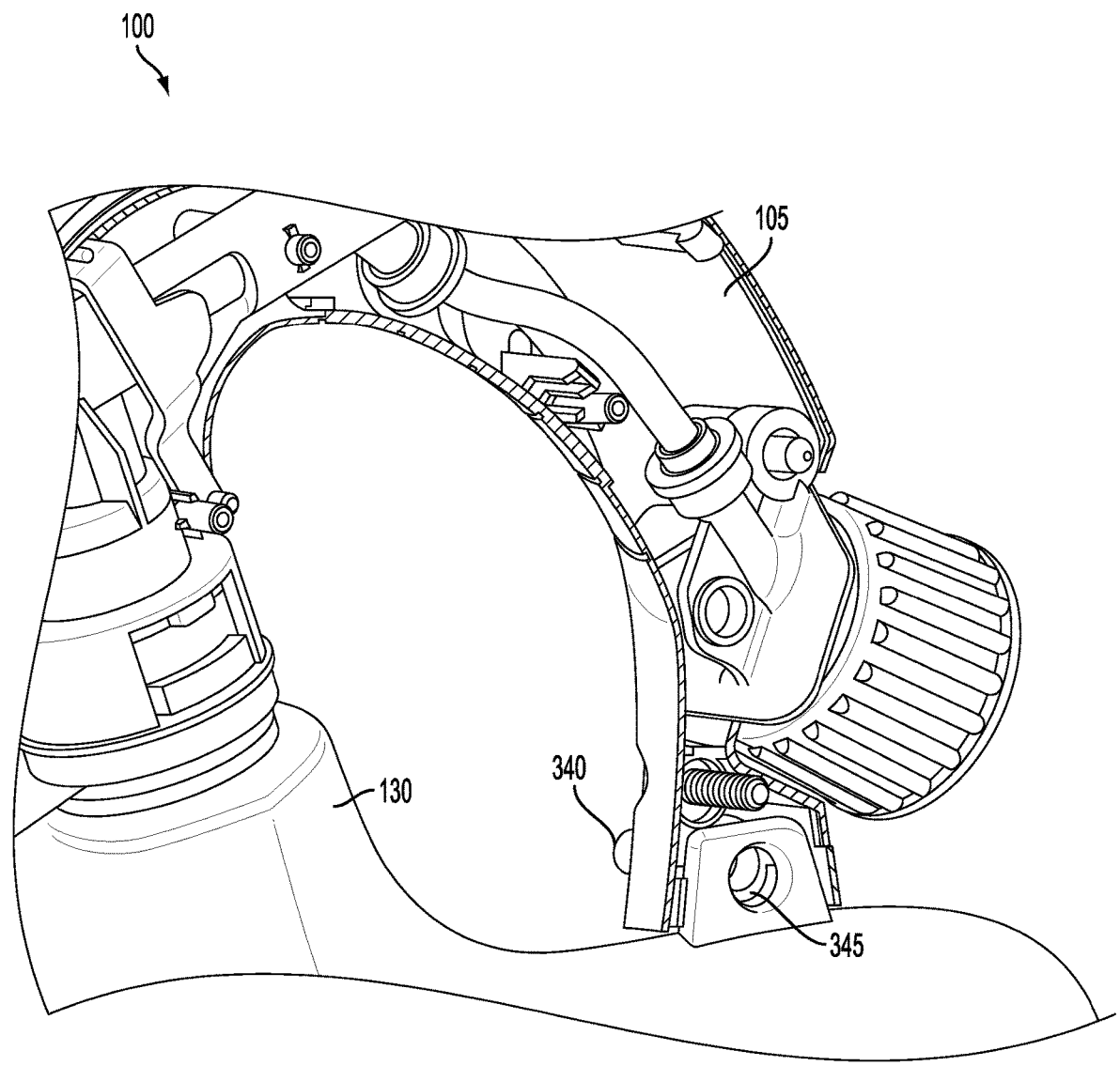
FIG. 3(b) is a perspective view of an embodiment of a mechanism for coupling a sprayer housing to a container.

FIG. 3(b) depicts a cross section view of a further exemplary embodiment of a connection between an exemplary sprayer housing 105 and a sprayer container 130. In particular, FIG. 3b depicts an alternative embodiment to the latch base 315 and latch 320, described above with regard to FIG. 3a. In the exemplary embodiment depicted in FIG. 3b, a pin 340 and a pin receiver 345 are configured to provide a secure connection between the sprayer housing 105 and the sprayer container 130. This arrangement provides for several efficiencies in the manufacturing process and also provides for a more reliable connection than typical fastening mechanisms. The pin 340 may be configured in any number of ways. In one exemplary embodiment, the pin 340 is formed as part of the housing 105. The outside portions of the pin 340 may be perforated, so that it may be easily "punched" through the pin receiver 345 during the manufacturing process in, for example, an automated assembly step.

Figure 3C:
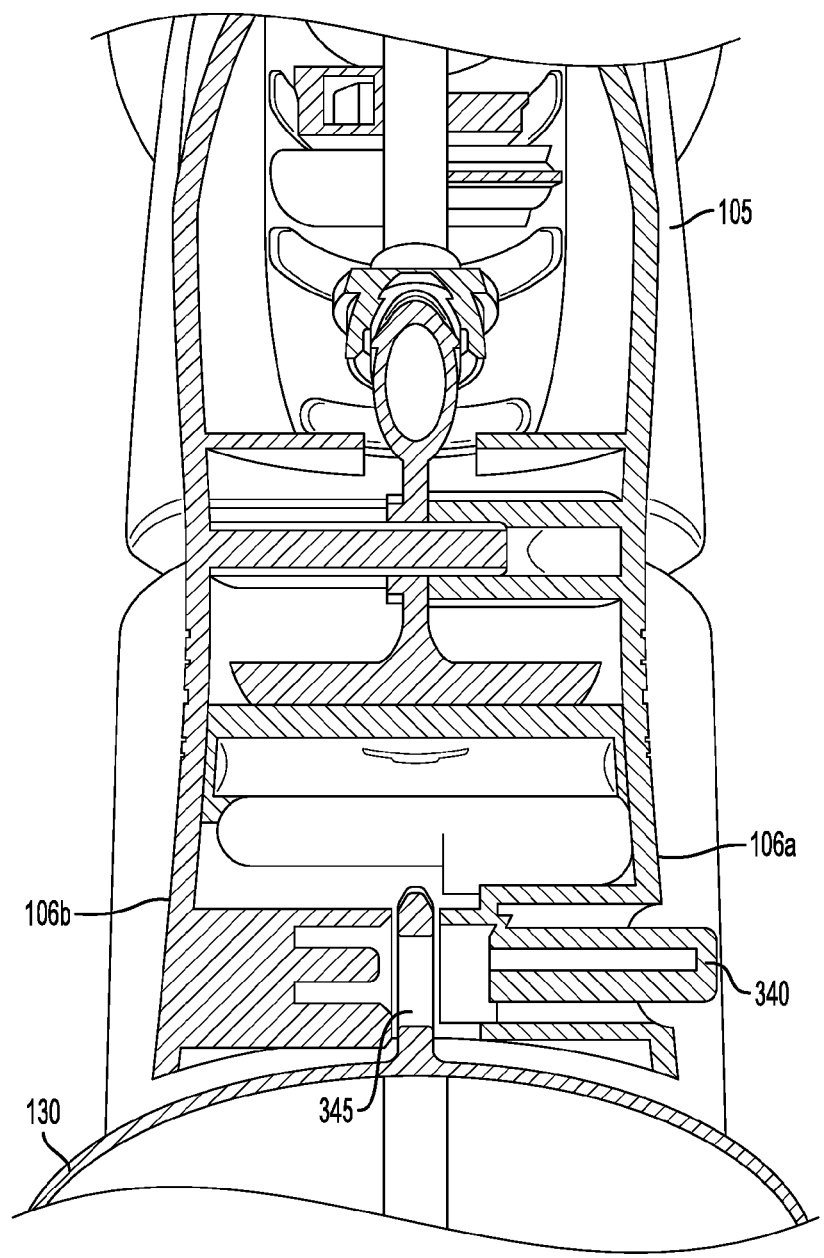
FIG. 3(c) is a cross-section view of an exemplary embodiment of a mechanism for coupling a sprayer housing to a container.
Figure 3D:
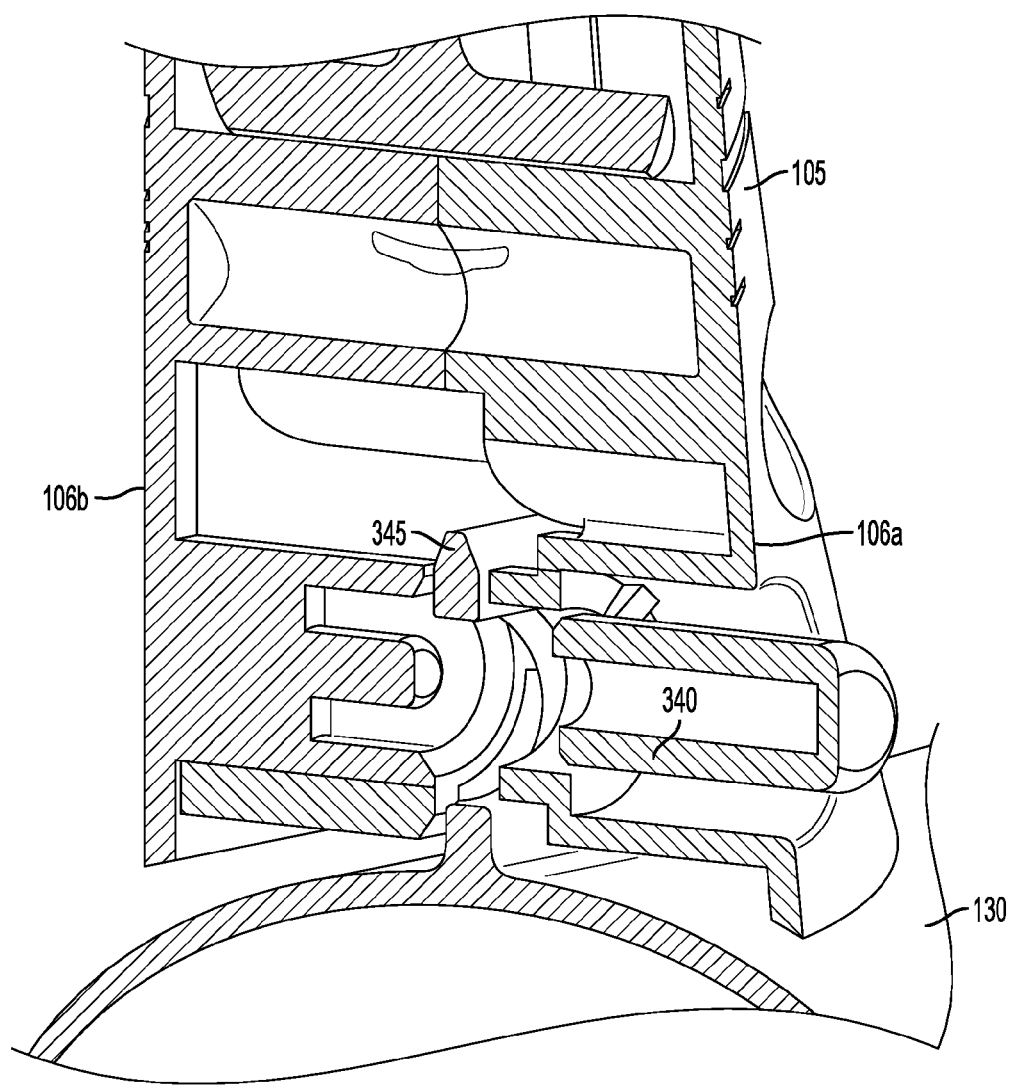
FIG. 3(d) is a perspective cross-section view of an exemplary embodiment of a mechanism for coupling a sprayer housing to a container.

FIGS. 3(c) and 3(d) depict cross sectional views of an exemplary embodiment of a connection between sprayer housing 105 and sprayer container 130. In the exemplary embodiment depicted in FIGS. 3(c) and 3(d), the pin 340 is in uninstalled position. In this position, the pin 340 does not extend through the pin receiver 345, thereby allowing the sprayer housing 105 to easily be placed proximate to the sprayer container 130 during the manufacturing process. Once the sprayer housing 105 and sprayer container 130 are appropriately positioned, the pin 340 may be "punched" through the pin receiver 345 in order to secure the sprayer housing 105 to the sprayer container 130. The pin 340 and pin receiver 345 may be configured in any number of ways to support any number of appropriate embodiments. For instance, the pin 340 may be configured to permanently couple with pin receiver 345 when installed. In other exemplary embodiments, the pin 340 may be dynamic, such that it may be uninstalled from the pin receiver 345, thereby permitting the sprayer housing 105 and sprayer container 130 to be removably connected.

In certain exemplary embodiments, each of the component parts described herein are injection molded to a desired shape. In some exemplary embodiments, each component part may be molded as a single, unitary molded part. In other exemplary embodiments, the component part may be molded in multiple parts that are joined or attached together to form the component part. The various means for designing molds, and joining various parts to form one component part will be understood by one familiar with such processes and parts.

In the preceding specification, various preferred exemplary embodiments have been described with reference to the accompanying drawings. It will, however, be evident that various modifications and changes may be made thereto, and additional exemplary embodiments may be implemented, without departing from the broader scope of the invention as set forth in the claims that follow. The specification and drawings are accordingly to be regarded in an illustrative rather than restrictive sense.

What is claimed is:

1. A sprayer comprising:
a container defining an interior compartment for containing a substance liquid, the container comprising a front portion, a rear portion, and a pin receiver on the rear portion, the container further defining a container opening in the front portion;
a housing comprising a grip portion, a main chamber, and a carrier liquid receiving port, and a carrier liquid conduit, wherein the grip portion defines a grip portion chamber extending at least between the carrier liquid receiving port and the main chamber, the carrier liquid conduit being coupled to the carrier liquid receiving port and extending through the grip portion chamber to the main chamber;
a substance liquid conduit in selective fluid communication with the container and with the main chamber;
a pivot switch on an exterior of the housing for selecting a fluid flow condition for the main chamber; and
a pivot arm operatively coupled to the pivot switch to translate movement of the pivot switch to the main chamber, the pivot arm being pivotally connected to a pivot axis, the pivot axis being located to a rear of the substance liquid conduit,
wherein the pivot switch is operatively coupled to the pivot arm to translate movement of the pivot switch, through an arcuate path, to the main chamber and the pivot axis is located below the main chamber; and
wherein the housing is coupled to the container at two separate points comprising: the container opening and the pin receiver.

2. The sprayer of claim 1, wherein the front portion is elevated with respect to the rear portion.

3. The sprayer of claim 1, further comprising a pin, wherein the pin is inserted through the pin receiver to couple the housing to the container at the pin receiver.

4. The sprayer of claim 3, wherein the pin is formed as part of the housing.

5. The sprayer of claim 3, wherein the pin receiver receives an outside portion of the pin.

6. The sprayer of claim 3, wherein the housing and the container are removably coupled through the pin and the pin receiver.

7. The sprayer of claim 1, wherein the grip portion is curved and the main chamber comprises a substance liquid inlet, a carrier liquid inlet located to a rear of the substance liquid inlet, and an outlet located to a front of the substance liquid inlet; and the housing further comprises: a nozzle in selective fluid communication with the outlet of the main chamber, wherein the housing is coupled to the container opening at the substance liquid inlet.

8. The sprayer of claim 1, wherein the grip portion and the pivot switch are positioned so that a user can hold the sprayer and move the pivot switch with one hand.

9. The sprayer of claim 1, wherein the carrier liquid conduit has a first end and a second end, the first end being coupled to the carrier liquid receiving port and the second end being coupled to carrier liquid inlet, the carrier liquid conduit being in selective fluid communication with the main chamber at the carrier liquid inlet.

10. The sprayer of claim 9, wherein the pivot switch controls a flow of a carrier liquid and the substance liquid into the main chamber.

11. The sprayer of claim 9, wherein the main chamber is configured to generate a vacuum to enable mixing of a carrier liquid and the substance liquid.

12. The sprayer of claim 1, wherein the main chamber comprises:
a rear chamber;
a middle chamber; and
a front chamber.

13. The sprayer of claim 12, wherein the rear chamber, the middle chamber, and the front chamber have different dimensions.

14. The sprayer of claim 12, wherein the main chamber is configured so that the mixing of a carrier liquid and the substance liquid occurs within the front chamber.

15. The sprayer of claim 1, wherein the main chamber comprises three operating positions, the three operating positions comprising:
a first operating position, wherein the main chamber is not in fluid communication with either the carrier liquid conduit or the substance liquid conduit;
a second operating position, wherein the main chamber is in fluid communication with both the carrier liquid conduit and the substance liquid conduit; and
a third operating position wherein the main chamber is fluid communication with the carrier liquid conduit but not with the substance liquid conduit.

16. The sprayer of claim 1, wherein the pivot switch comprises a top end that is movable from a first position in front of the pivot axis to a second position to a rear of the pivot axis.

17. A sprayer comprising:
a container defining an interior compartment for containing a substance liquid; the container comprising a front portion, a rear portion, and a pin receiver on the rear portion, the container further defining a container opening in the front portion;
a housing comprising:
a curved grip portion,
a main chamber comprising a substance liquid inlet, a carrier liquid inlet, and an outlet,
a carrier liquid receiving port, wherein the curved grip portion defines a curved grip portion chamber extending at least between the carrier liquid receiving port and the main chamber,
a carrier liquid conduit, the carrier liquid conduit being coupled to the carrier liquid receiving port and extending through the curved grip portion chamber to the carrier liquid inlet of the main chamber, and
a nozzle in selective fluid communication with the outlet of the main chamber;
a substance liquid conduit in selective fluid communication with the container and with the main chamber; and
a pivot switch having three operating positions, the pivot switch being located on an exterior of the housing for selecting a fluid flow condition for the main chamber, wherein the pivot switch is operatively coupled to a pivot arm to translate movement of the pivot switch, through an arcuate path, to the main chamber and the pivot arm is pivotally connected to a pivot axis, the pivot axis being located below the main chamber and to a rear of the substance liquid conduit,
wherein the housing is coupled to the container at the container opening through the substance liquid inlet and at the pin receiver through a pin inserted through the housing and the pin receiver.

18. The sprayer of claim 17, wherein, when the main chamber moves from a first operating position to a second operating position or a third operating position, the pivot switch moves forward towards the front portion of the container.

19. The sprayer of claim 18, wherein, when the pivot switch moves from one of the three operating positions in which the main chamber is not in fluid communication with the carrier liquid conduit to another of the three operating positions in which the main chamber is in fluid communication with the carrier liquid conduit, the pivot switch moves forward towards the front portion of the container.

* * * * *